Inventors
Arthur Bradshaw
Brian M. Woollatt
By their Attorney

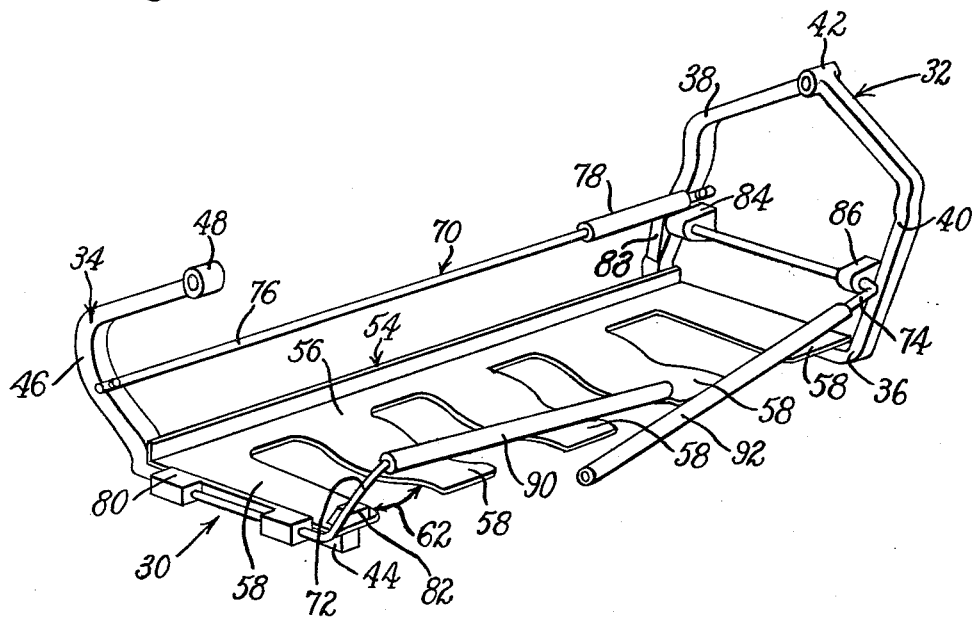

United States Patent Office 3,197,019
Patented July 27, 1965

3,197,019
HEAT SETTING CABINETS
Arthur Bradshaw and Brian M. Woollatt, Leicester, England, assignors to United Shoe Machinery Corporation, Boston, Mass., a corporation of New Jersey
Filed Nov. 6, 1962, Ser. No. 235,771
Claims priority, application Great Britain, Jan. 13, 1962, 1,328
4 Claims. (Cl. 198—156)

This invention relates to apparatus for use in the conditioning of a shoe or a portion thereof and, more particularly, is concerned with a heat setting cabinet employed in the conditioning of shoe uppers. The utilization of the novel apparatus disclosed hereinafter is not, however, limited to application for this purpose nor in the specific embodiment described.

In the conditioning of shoe uppers by heat setting, it is desirable that means be provided which facilitate systematic introduction to and removal from the heating medium. The removal of the heated shoe upper is most conveniently and expeditiously accomplished by automatic means in order to prevent exposure of the operator to the heated upper and further, to permit maximum automation of the conditioning process and appurtenant operations. It is also of paramount importance that maximum exposure of the shoe upper to the heating medium be attained during the heating process. This is obviously necessary to insure uniform and complete drying and shrinkage of the shoe upper.

A shoe part is particularly vulnerable to damage and marking during conditioning by heat setting due to the temperature of the apparatus used to accomplish the heating thereof and, further, due to the heated condition of the surface of the shoe upper. Accordingly, it is desirable that contact between the shoe upper and apparatus for conditioning the same be minimized.

In view of the foregoing, an object of the present invention is to provide a heat setting cabinet having apparatus which facilitates introduction of an article to the heating area of said cabinet and automatic removal therefrom.

A further object of this invention is to provide a means for holding an article during the presentation to the heating medium which minimizes the danger of marking while attaining maximum exposure of the surface area to the heating medium.

To this end and in accordance with a feature of this invention, there is provided a heat setting cabinet having a loading station and an unloading station, transport means, a plurality of novel holders supported on the transport means and conveyed thereby through said cabinet from the loading station to the unloading station, and removal means cooperating with said holders automatically and systematically to remove shoes therefrom at the unloading station.

The above and other features of the invention, including novel details of construction and combinations of parts, will now be described in the following specification and will be pointed out in the appended claims.

In the drawings,

FIG. 3 is a perspective view of a shoe holder used with the apparatus illustrated in FIGS. 1 and 2.

The illustrated apparatus has a cabinet or external housing 10 (FIG. 1) which encloses an area wherein a heating medium is introduced to a shoe upper or other article. The heating medium may consist of hot air directed through nozzles onto the article to be conditioned or other means adapted to function in an equivalent manner.

Figure 1:
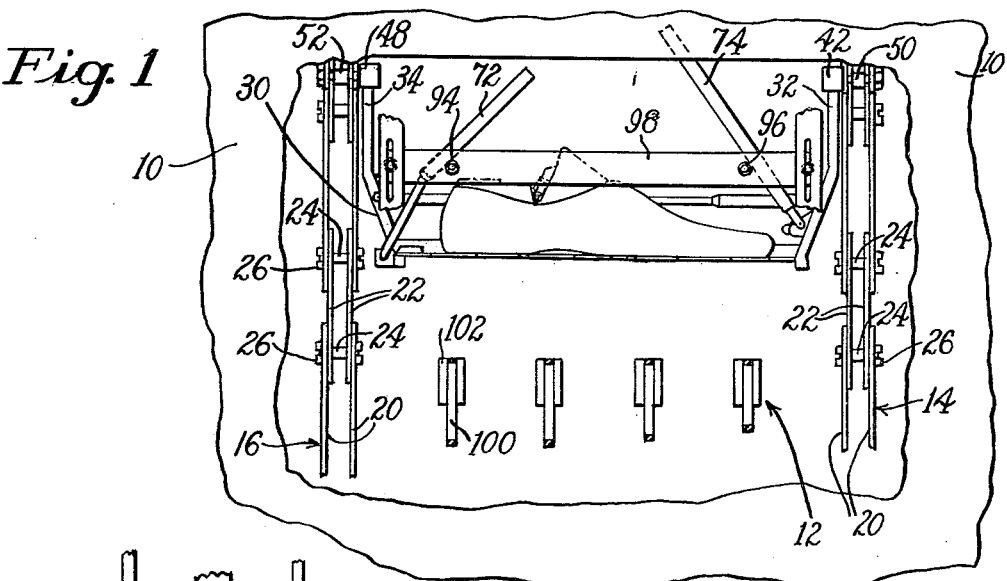
FIG. 1 is a front elevation of a portion of apparatus in which the invention is embodied.
Figure 2:
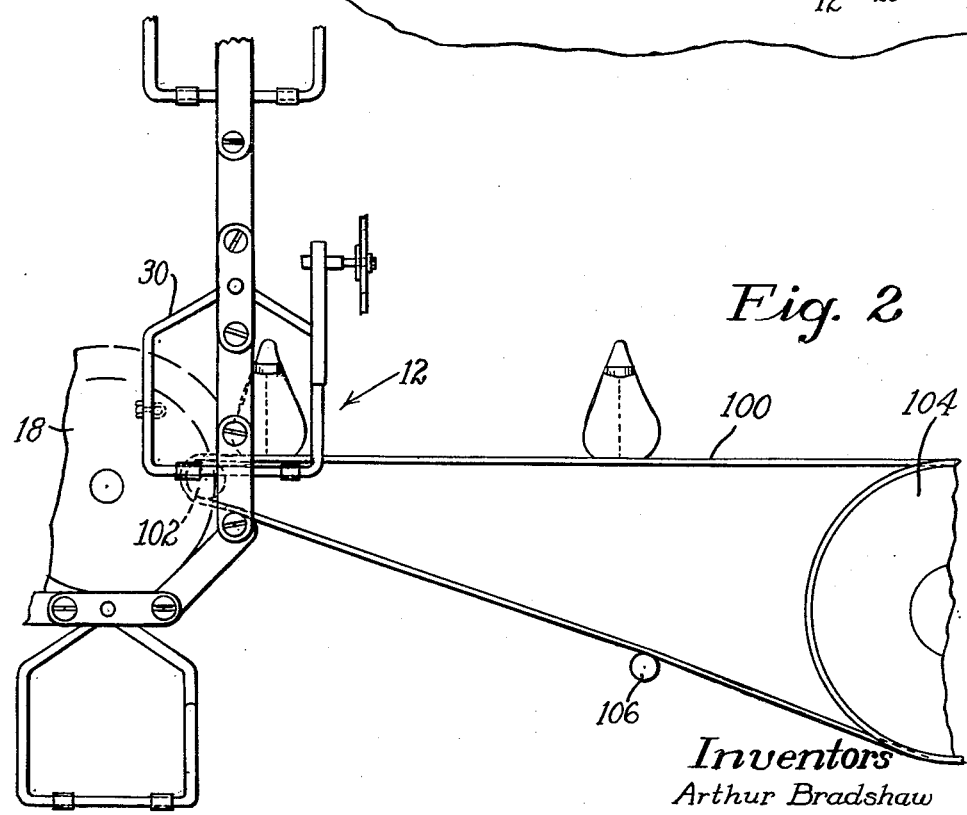
FIG. 2 is a side view of the apparatus illustrated in FIG. 1 but showing a shoe holder in operative relation to the removal means.

The heat setting cabinet has a loading station (not shown) and an unloading station 12 (FIGS. 1 and 2). Transport means comprising two cooperative coextensive chains 14, 16 is operative between the loading station and the unloading station 12 and follows a circuitous path through the heating area of the heat setting cabinet thereby providing exposure to the heating medium for a duration sufficient to ensure complete and uniform conditioning of an article transported thereby. In the embodiment illustrated in FIGS. 1 and 2, the chains 14, 16 traverse complementary up and down paths through the heat setting cabinet, the terminal portion of which is illustrated in said figures. The exact path followed by the transport means is determined by a plurality of pulleys located within the heat setting cabinet, one of which is denoted in FIG. 2 by the reference character 18.

The cooperating chains 14, 16 each comprise a series of coextensive outer plates 20, 20 alternately aligned with a series of coextensive inner plates 22, 22. The inner plates 22, 22 are retained in uniform spaced relationship by spacing members 24, 24 positioned at opposite ends thereof, the outer plates 20, 20 being pivoted to the inner plates 22, 22 by means of bolts 26 located at the terminal portions of the spacing members 24, 24.

A plurality of holders 30 (FIGS. 1, 2 and 3) are mounted between the chains 14, 16, as hereinafter described, and are conveyed thereby through the heat setting cabinet in the path delineated hereinabove during the operation of the apparatus. The holder 30 is designed for the conveyance of shoe uppers, it being understood that a species thereof having functional characteristics equivalent to those of the novel holder described hereinafter can be employed for articles having a different configuration.

The shoe holder 30 has two side mounting members 32 and 34 (FIG. 3) having means thereon for mounting the holder on the transport means. The side member 32 comprises a horizontal base member 36 and two upwardly extending limbs, 38, 40 joined at a point above said base member. A boss 42 is formed at the junction of the limbs 38 and 40, said boss having a stud receiving aperture therein. The side member 34 comprises a horizontal base member 44 and a limb 46 extending upwardly from the rear portion of said base member and conforming to the configuration of the rearward limb 38 of the side member 32. A boss 48 is formed at the terminus of the limb 46 in alignment with the boss 42, said boss 48 also having a stud receiving aperture therein. The shoe holder 30 is supported on the transport means by studs 50, 52 (FIG. 1) passing through the chains 14, 16, respectively, and into the apertures in the bosses 42, 48 on the side members 32, 34, respectively. The shoe holder is positioned on the transport means in such manner that the side member 34 faces the operator at the loading station. The absence of a forward limb provides the operator with unobstructed access to the holder and thereby facilitates the positioning of an article thereon.

As illustrated in FIG. 3, the shoe holder 30 has a support member 54 affixed at the opposite ends thereof to the base members 36, 44 of the side members 32, 34, respectively, and extending therebetween. The support member 54 is preferably affixed in such manner as to permit limited movement of said side members, thereby to accommodate slight variations in the spacial relationship of the chains 14, 16 and to provide that degree of flexibility required during the circuitous passage through the heat setting cabinet and the automatic removal at the unloading station. The support member 54 comprises a rearward base portion 56 having a plurality of fingers 58 extending forwardly therefrom. The fingers 58 form a series of slots 62 through which the conveyorized removal means passes to remove a shoe located on the shoe holder, as hereinafter described. A shoe upper is positioned on the shoe holder traversely of the slots.

The shoe upper or other article to be conditioned is retained in position on the holder 30 by retaining members 70, 72, and 74 (FIG. 3). The retaining member 70 comprises a first component 76 mounted on the limb 46 and slidable within a second component 78 mounted on the limb 38. The sliding relationship between the first component 76 and the second component 78 provides the flexibility necessary to compensate for variations in the spacial relationship of the chains 14, 16 of the transport means.

The retaining member 72 is pivoted on a mounting block 80 affixed to the base member 44 of the side member 34. The block 80 has two bosses thereon having aligned apertures to receive an end of the retaining member 72 and to facilitate rotation thereof. The normal operative position of the retaining member 72 is determined by contact of an intermediate portion thereof with a stop 82 positioned on a finger 58 of the support member 54. The retaining member 72 extends more than half way across the front of the shoe holder 30 when it is located in a normal operative position.

The retaining member 74 is pivotally mounted on the side member 32 by means of blocks 84, 86 which are affixed to the limbs 38, 40, respectively. The normal operative position of the retaining member 74 is fixed by contact of a stop 88 secured to the member 74 with the limb 38. The retaining member 74 is L-shaped and extends more than half way across the front of the shoe holder 30 thereby overlapping but not contacting the retaining member 72.

The retaining members 72, 74 are covered with resin bound fiber glass sleeves 90, 92 to prevent damage to an article being conditioned by contact with said retaining members. Other portions of the holder may be similarly coated.

Prior to the passage of the holder 30 through the unloading station, the retaining members 72, 74 are pivoted out of normal operative position to permit the unobstructed removal of the conditioned article from said holder. As illustrated in FIG. 1, the retaining members are pivoted upwardly from the normal operative position by cam rolls 94, 96 secured to a member 98 affixed to the cabinet 10. The cam rolls 94, 96 are positioned such that the retaining members 72, 74 will be out of operative position during the removal process and will pass off said cams and fall back into operative position after said removal has been accomplished.

The removal means comprises a plurality of endless conveyor belts 100 (FIGS. 1 and 2) of a number equal to or less than the number of slots 62 in the support member 54 of the shoe holder. The conveyor belts 100 are located within the unloading station in such position as to accommodate passage of the fingers 58 of the holder 30 therebetween and extend outwardly therefrom to convey a conditioned article away from the heating apparatus thereby to place said article in position for a subsequent operation thereon. The belts 100 pass around idler pulleys 102 and drive pulleys 104 (FIG. 2). Idler pulleys 106 (only one of which is shown) are utilized to maintain a proper amount of tension in the belts 100.

In the operation of the above described apparatus, an article to be conditioned is initially placed on the holder 30 at the loading station by the operator, said placement being easily and safely accomplished due to the novel construction of said holder. The article is thereafter circuitously conveyed through the heating medium by the conveyorized transport means. The configuration of the holder 30 and the retaining members 70, 72, and 74 attached thereto insure that the article is retained in position during the transporting thereof, thereby preventing damage thereto. At the completion of the heating process, the forward retaining members 72, 74 are pivoted out of operative positions by the cam rolls 94, 96 and the article removed by the removal means at the unloading station. The automated removal means can be employed to deposit the conditioned article in storage or in position for a subsequent operation.

Thus, the apparatus of the present invention facilitates systematic introduction of articles to the heating medium and automates the removal of said articles. The novel holder provides maximum exposure of the article to be conditioned and minimizes the danger of marking thereof. The automated removal, insured retention on the holder, and ease in loading combine to provide increased speed and safety in the handling of articles requiring conditioning and thereby result in economic advantages in the use of the subject invention.

Having thus described our invention what we claim as new and desire to secure by Letters Patent of the United States is:

1. In a heat setting cabinet of the type having a loading station and an unloading station, transport means operative between said loading station and said unloading station through the heating area of said heat setting cabinet, a plurality of holders mounted on said transport means and conveyed thereby during the operation of said cabinet, each of said holders comprising a support member for holding an article, means for mounting said holder on said transport means, and means for retaining an article in position on said support member and permitting automated removal thereof at the unloading station, said retaining means comprising a first member mounted on the rearward portion of said holder and two overlapping members pivotally mounted on the opposite end portions thereof and extending across the forward portion thereof, cam means positioned on said cabinet for pivoting said overlapping members out of operative position at said unloading station thereby to permit removal of an article, and removal means cooperative with said support member automatically to remove an article from said heat setting cabinet.

2. In a heat setting cabinet of the type having a loading station and an unloading station, transport means operative between said loading station and said unloading station through the heating area of said heat setting cabinet, a plurality of holders mounted on said transport means and conveyed thereby during the operation of said cabinet, each of said holders comprising a support member for holding an article having a plurality of slots therein to facilitate removal of said article therefrom, means for mounting said holder on said transport means, and means for retaining an article in position on said support member and permitting automated removal thereof at the unloading station, said retaining means comprising a first member mounted on the rearward portion of said holder and two overlapping members pivotally mounted on the opposite end portions thereof and extending across the forward portion thereof, cam means positioned on said cabinet for pivoting said overlapping members out of operative position at said unloading station thereby to permit removal of an article, and removal means co-operative with said support member automatically to remove said article from said heat setting cabinet, said removal means comprising a plurality of conveyors which pass through said slots during the passage of said support member through the unloading station thereby to remove an article from said support member.

3. In a heat setting cabinet of the type having a loading station and an unloading station, transport means operative between said loading station and said unloading station through the heating area of said heat setting cabinet, a plurality of holders mounted on said transport means and conveyed thereby during the operation of said cabinet, each of said holders comprising mounting means including two spaced side members mountable on said transport means, a support member extending between said side members for holding an article to be heated and connected thereto for limited movement relatively thereto, and means for retaining an article in position on said support member and permitting automated removal thereof at the unloading station, said retaining means comprising a first member mounted on the rearward portion of said holder, said first member including a first component mounted on one of said side members and slidable within a second component mounted on the other of said side members, and two overlapping members pivotally mounted on the opposite end portions of said holder and extending across the forward portion thereof, said overlapping members normally being retained in an operative position by stop means, cam means positioned on said cabinet for pivoting said overlapping members out of operative position at said unloading station thereby to permit removal of an article, and removal means co-operative with said support member automatically to remove said article from said heat setting cabinet.

4. In a heat setting cabinet of the type having a loading station and an unloading station, transport means operative between said loading station and said unloading station through the heating area of said heat setting cabinet, a plurality of holders mounted on the transport means and conveyed thereby during the operation of said cabinet, each of said holders comprising mounting means including two spaced side members mountable on said transport means, a support member extending between said side members for holding an article to be heated and connected thereto for limited movement relatively thereto, said support member including a rearward base portion having a plurality of fingers extending forwardly therefrom, said fingers forming a series of slots which facilitate the removal of an article from said holder, and means for retaining an article in position on said support member and permitting automated removal thereof at the unloading station, said retaining means comprising a first member mounted on the rearward portion of said holder, said first member including a first component mounted on one of said side members and slidable within a second component mounted on the other of said side members, and two overlapping members pivotally mounted on the opposite end portions of said holder and extending across the forward portion thereof, said overlapping members normally being retained in an operative position by stop means, cam means positioned on said cabinet for pivoting said overlapping members out of operative position at said unloading station thereby to permit removal of an article, and removal means co-operative with said support member automatically to remove an article from said heat setting cabinet, said removal means comprising a plurality of conveyors which pass through said slots during the passage of said support member through the unloading station thereby to remove an article from said support member.

References Cited by the Examiner

UNITED STATES PATENTS

| | | | |
|---|---|---|---|
| 1,186,284 | 6/16 | Coulieries et al. | 198—156 X |
| 1,236,300 | 8/17 | Hastings | 198—156 X |
| 1,423,765 | 7/22 | Hastings | 198—154 |
| 2,592,879 | 4/52 | Eyerly | 272—38 X |

SAMUEL F. COLEMAN, *Primary Examiner.*

ERNEST A. FALLER, JR., *Examiner.*